US010365377B1

(12) United States Patent
Liu et al.

(10) Patent No.: US 10,365,377 B1
(45) Date of Patent: Jul. 30, 2019

(54) APPARATUS AND METHOD FOR MOBILITY MODE STATE DETECTION (71) Applicant: Marvell International Ltd., Hamilton (BM)

(72) Inventors: BoChih Liu, Shanghai (CN); Zhike Jia, Fremont, CA (US); Jing Yu, Shanghai (CN); Jinfeng Liu, Shanghai (CN); Mobo Qiu, Shanghai (CN)

(73) Assignee: Marvell International Ltd., Hamilton (BM)

(*) Notice: Subject to any disclaimer, the term of this patent is extended or adjusted under 35 U.S.C. 154(b) by 333 days.

(21) Appl. No.: 15/248,423

(22) Filed: Aug. 26, 2016

Related U.S. Application Data (60) Provisional application No. 62/233,559, filed on Sep. 28, 2015.

(51) Int. Cl.
G01S 19/42 (2010.01)
H04W 64/00 (2009.01)
G01S 19/52 (2010.01)
H04W 8/02 (2009.01)
G01S 19/13 (2010.01)
G01S 19/14 (2010.01)

(52) U.S. Cl.
CPC .............. *G01S 19/42* (2013.01); *G01S 19/52* (2013.01); *H04W 64/00* (2013.01); *G01S 19/13* (2013.01); *G01S 19/14* (2013.01); *H04W 8/02* (2013.01); *H04W 64/006* (2013.01)

(58) Field of Classification Search
CPC .......... G01S 19/13; G01S 19/14; G01S 19/42; G01S 19/52; H04W 64/00; H04W 64/006; H04W 8/02
USPC .......................... 342/357.25, 357.35, 357.52
See application file for complete search history.

(56) References Cited

U.S. PATENT DOCUMENTS

| 8,326,257 | B2 * | 12/2012 | Shiu ...................... H04B 7/0613 455/403 |
| 8,886,457 | B2 * | 11/2014 | Brandt ............... G01C 21/3484 455/344 |
| 9,591,458 | B2 * | 3/2017 | Liu ......................... H04W 4/04 |
| 9,642,110 | B2 * | 5/2017 | Liu ...................... H04W 64/00 |
| 2014/0278084 | A1 * | 9/2014 | Lau ......................... G01S 19/34 701/526 |
| 2014/0287783 | A1 * | 9/2014 | Czompo ............... H04W 4/027 455/456.6 |

(Continued)

Primary Examiner — Chuong P Nguyen (57) ABSTRACT

Systems and methods are provided for detecting a mobility mode of a mobile device. The method, in response to receiving an observation decision, comprises finding (e.g., recursively) the most probable mobility mode state of the wireless mobile device using a dynamic programming algorithm based on a Hidden Markov Model that comprises: calculating the probability for the observation by the knowledge of the observation and probability of the previous state using the transition probability and multiplying by the emission probability of observation for the state, obtaining the maximum probability for the detected mobility mode states, determining a mobility mode state with the maximum probability, and storing the mobility mode state data of the wireless mobile device in a given FIFO queue of the one or more FIFO queues. The method future comprises controlling the output of the position data by acquiring the satellite navigation data on an interval basis.

16 Claims, 7 Drawing Sheets (56) References Cited

U.S. PATENT DOCUMENTS

2017/0153313 A1\* 6/2017 Tsai ..................... G01C 21/14

\* cited by examiner

APPARATUS AND METHOD FOR MOBILITY MODE STATE DETECTION

CROSS-REFERENCE TO RELATED APPLICATIONS

The present application claims priority from U.S. Provisional Application Ser. No. 62/233,559 entitled "Mobility Mode Management in GNSS Application," filed 28 Sep. 2015, the entirety of which is hereby incorporated by reference.

FIELD

This disclosure is related generally to the field of mobility mode state detection and more particularly to apparatuses and methods for Global Navigation Satellite System (GNSS) based mobility mode state detection for wireless mobile devices in applications.

BACKGROUND

A wireless mobile device including one or more location-aware applications is configured to implement location based tasks, such as locating a business and providing directions. Location-aware applications depend on positioning systems to determine a location of a wireless mobile device. One example of a positioning system is configured to incorporate a Global Navigation Satellite System (GNSS) receiver in a wireless mobile device. The GNSS positioning system specifies a real-time location of the device by use of signals from satellites in view. Detection of a mobility mode state can be one of the major functions of GNSS applications. The aim of mobility mode state detection is to enable a device to be aware of which type of movement the wireless mobile device is currently undergoing, allowing location output and power consumption to be controlled by the device. Generally, the combinations of various types of Micro-electro-mechanical Systems (MEMS) sensors, for example, a combination of accelerometer and gyroscope, are used to detect mobility mode state for the wireless mobile device in GNSS applications. Although it may make sense to detect mobility mode state using MEMS sensors coupled to the wireless mobile device in some contexts, that detection, depending on the position and direction of the device, may be ambiguous if the real-time calibrations of MEMS sensors do not work well. Accordingly, the probability that the mobility mode state detection returning an "un-defined" state may be high. Such use of only MEMS sensors for mobility mode decision making without verification can result in wrong mobility mode state conclusions.

SUMMARY

Aspects of the disclosure provide an apparatus. The apparatus includes: a GNSS receiver configured to receive satellite signals sent from a satellite navigation system, a memory configured to include a location determination algorithm, a mobility mode state detection algorithm, and one or more first-in, first-out (FIFO) queues, and a processor. In one example, the processor may be configured to acquire the satellite navigation data from the GNSS receiver and store the acquired satellite navigation data into one or more FIFO queues. In another example, the processor may be configured to estimate the position data of the wireless mobile device by executing a location determination algorithm stored in the memory and store the position data of the wireless mobile device into one or more FIFO queues as the position data is determined. In still another example, the processor may be configured to detect a mobility mode in which the wireless mobile device is in by executing a mobility mode state detection algorithm stored in the memory and store the mobility mode state data of the wireless mobile device into one or more FIFO queues as the mobility mode is determined.

In one embodiment, the processor may be configured to acquire position data of the wireless mobile device from a given FIFO queue of the one or more FIFO queues. The position data may include position information, velocity and time of the location. The processor may also be configured to make observation decision based on an acquired position data. Specifically, the processor is configured to acquire the velocity data based on the position data to detect mobility mode of the wireless mobile device and to make observation decisions using the confidence limits of hidden mobility mode estimate based on the acquired velocity data.

In another embodiment, the processor may be configured to acquire mobility mode state data of the wireless mobile device from a given FIFO queue of the one or more FIFO queues. The mobility mode state data may include the observation and probability of the state that was determined at the previous time to be stored in the queue.

In yet another embodiment, the processor in response to receiving the observation decision may be configured to find (e.g., recursively) the most probable mobility mode of the wireless mobile device using a dynamic programming algorithm based on a Hidden Markov Model (HMM) that comprises operations including: calculating the probability for the observation by the knowledge of the observation and probability of the previous state using the transition probability multiplied by the emission probability of observation for the state, obtaining the maximum probability for the detected mobility mode states, determining a mobility mode state with the maximum probability, and storing the mobility mode state data of the wireless mobile device in a given FIFO queue of the one or more FIFO queues. In response to receiving the results of mobility mode state detection, the processor is configured to control the output of the position data by acquiring the satellite navigation data on an interval basis.

Aspects of the disclosure provide a method. The method comprises receiving, using a GNSS receiver, satellite signals sent from a satellite navigation system; including, in a memory, a location determination algorithm, a mobility mode state detection algorithm, and one or more FIFO queues; and using a processor to acquire satellite navigation data from the GNSS receiver, store the acquired satellite navigation data into one or more FIFO queues, estimate position data of the wireless mobile device by executing a location determination algorithm stored in the memory, store the position data of the wireless mobile device into one or more FIFO queues as the position data is determined, detect a mobility mode in which the wireless mobile device is in by executing a mobility mode state detection algorithm stored in the memory, and store the mobility mode state data of the wireless mobile device into one or more FIFO queues as the mobility mode is determined.

In one embodiment, the method comprises acquiring, using a processor, position data of the wireless mobile device from a given FIFO queue of the one or more FIFO queues. The position data may include position information, velocity and time of the location. The method future comprises making an observation decision based on an acquired position data. Specifically, the method comprises acquiring the velocity data of the position data to detect a mobility mode of the wireless mobile device, and making an observation decision using the confidence limits of a hidden mobility mode estimate based on the acquired velocity data.

In another embodiment, the method comprises acquiring, using a processor, mobility mode state data of the wireless mobile device from a given FIFO queue of the one or more FIFO queues. The mobility mode state data may include the observation and probability of the state that was determined at the previous time to be stored in the queue.

In yet another embodiment, the method, in response to receiving the observation decision, comprises recursively finding, using a processor, the most probable mobility mode of the wireless mobile device using a dynamic programming algorithm based on a Hidden Markov Model that comprises: calculating the probability for the observation by the knowledge of the observation and probability of the previous state using the transition probability and multiplying by the emission probability of observation for the state, obtaining the maximum probability for the detected mobility mode states, determining a mobility mode state with the maximum probability, and storing the mobility mode state data of the wireless mobile device in a given FIFO queue of the one or more FIFO queues. In response to receiving the results of mobility mode state detection, the method further comprises controlling, using the processor, the output of the position data by acquiring the satellite navigation data on an interval basis.

DETAILED DESCRIPTION

Figure 1:
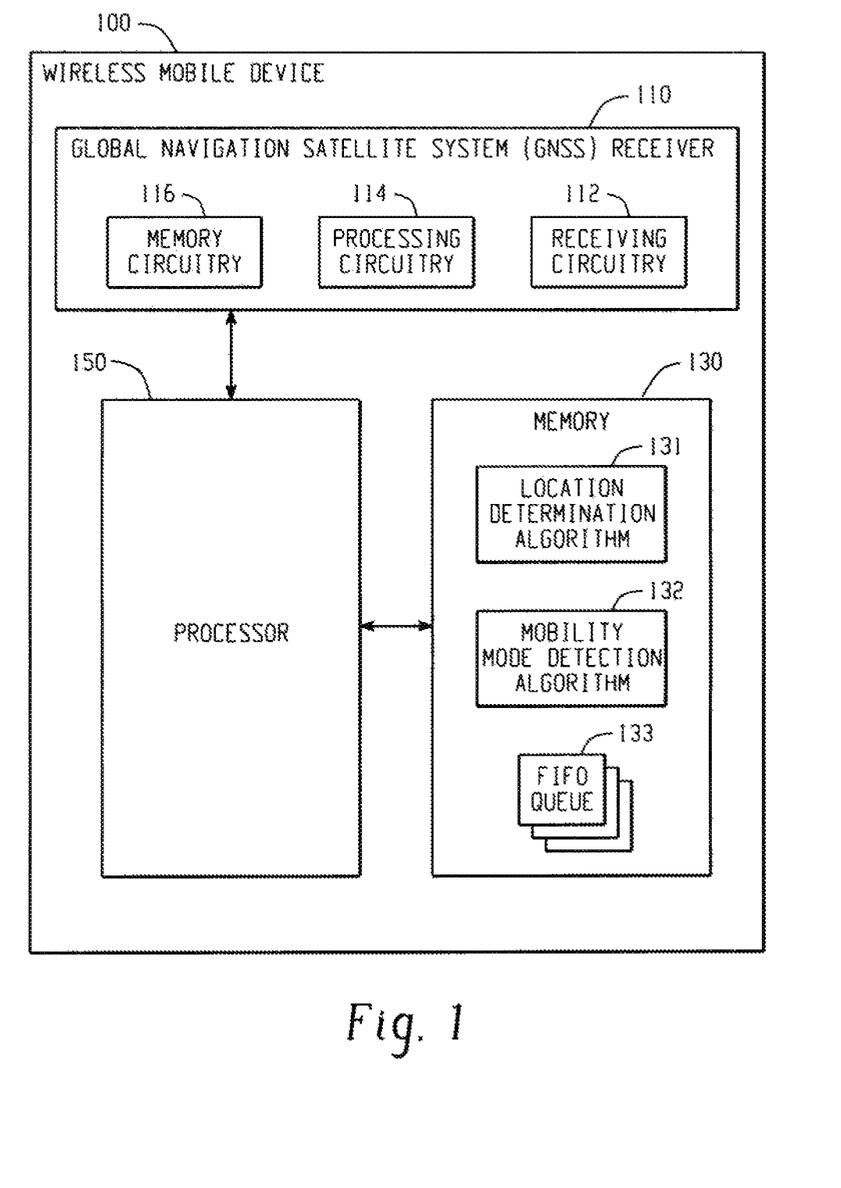
FIG. 1 is an example diagram illustrating a wireless mobile device for detecting mobility mode state according to an embodiment of the disclosure.

FIG. 1 is an example diagram illustrating a wireless mobile device 100 for implementing Global Navigation Satellite System (GNSS) based mobility mode state detection according to some embodiments of the disclosure. As illustrated therein, the wireless mobile device 100 may include a plurality of components, each of which acts to provide specific functionality. These components may include software which is stored in a storage and then executed by a processor to provide the functionality, hardware which is adapted to provide the component's functionality, or a combination of software and hardware which is working together to provide the component's functionality.

The wireless mobile device 100 may represent any type of mobile computing device. By way of example, the wireless mobile device 100 may be a mobile phone. However, this example is not meant to be limiting. In other examples, the wireless mobile device 100 may be a laptop computer, a tablet computer, a wearable device, a device installable on vehicles, and the like.

As shown in FIG. 1, the wireless mobile device 100 is configured to execute one or more applications that require position information of a location of the device. In one example, the wireless mobile device 100 can be a mobile phone belonging to a user who has subscribed an information service, such as a traffic service, a business service, a weather service, and the like, from a service provider. The mobile phone executes a mobile application, for example provided by the service provider. In one example, the mobile application requires position information of the location of the mobile phone, and then provides location dependent information to the user. Generally, position information of the location is related to geographic coordinates that may include a latitude coordinate, longitude coordinate, and an altitude coordinate of the wireless mobile device 100 and can be determined from various sources, such as from a satellite navigation system, a cellular network system, a wireless local area network (WLAN) system, and the like. In the FIG. 1 example, position information of the location for the wireless mobile device 100 in applications can be determined by signals sent from the satellite navigation system.

According to an aspect of the disclosure, the wireless mobile device 100 is an energy limited device powered by a battery (not shown), and accordingly the device may include power management protocols that seek to prolong battery life as long as possible while providing levels of computing service in line with specifications or user expectations. In one example, the wireless mobile device 100 may include a plurality of hardware and software components that can be controlled to manage power consumption while providing needed/desired functionality.

As shown in FIG. 1, the wireless mobile device 100 includes a GNSS receiver 110, a memory 130, and a processor 150. The processor 150 may be any type of processor, such as a microprocessor, digital signal processor, multi-core processor, and the like. In one example, the processor 150 may be a processor that is a component of a GNSS receiver 110. In another example, the wireless mobile device 100 may include a system on a chip (SoC) having an application processor (not shown). The processor 150 may be a low power core that is a component of the application processor. For example, the application processor may be a multi-core processor and a given core of the multi-core processor may be reserved for use as a processor.

In the FIG. 1 example, the GNSS receiver 110 includes a receiving circuitry 112, a processing circuitry 114, and a memory circuitry 116 coupled together. According to an aspect of the disclosure, the GNSS receiver 110 is configured to receive satellite signals sent from a satellite navigation system, such as the Global Positioning System (GPS), the GLObalnaja NAvigatsionnaja Sputnikovaja Sistema (GLONASS) satellite system, the Galileo navigation satellite system, the Beidou navigation satellite system, and the like.

The receiving circuitry 112 is coupled to an antenna (not shown) that generates an electrical signal in response to electromagnetic waves corresponding to satellite signals in the air. The receiving circuitry 112 includes suitable circuits to process the electrical signal and obtain a digital signal from the electrical signal. In one example, the receiving circuitry 112 includes various analog circuits (not shown), such as an amplifier, filter, down-converter and the like, to process the electrical signal using analog processing techniques. In addition, the receiving circuit 112 includes an analog-to-digital converter (ADC) (not shown) that converts the processed analog signal to a digital sequence. The digital sequence includes information, such as ranging information for measuring the distance from satellites to the wireless mobile device 100, navigation data sent from the satellites, and the like.

The processing circuitry 114 includes digital circuits to process the digital sequence to obtain the information. In one example, the processing circuitry 114 includes circuits to correlate the digital sequence with locally generated codes in the GNSS receiver 110, and includes circuits to demodulate and decode the digital sequence to extract the navigation data.

The memory circuitry 116 is configured to store instructions and data. In one example, the processing circuitry 114 is executed using a central processing unit (CPU). The memory circuit 116 stores instructions for controlling the CPU to process the digital sequence. In another example, the memory circuit 116 stores data to assist the GNSS receiver 110 to speed up a start process.

In the FIG. 1 example, the memory 130 may be any type of memory, such as volatile memory like random access memory (RAM), dynamic random access memory (DRAM), static random access memory (SRAM), or non-volatile memory like read-only memory (ROM), flash memory, among other devices used to store data or instructions on a temporary or permanent basis. It should be noted that the memory 130 is shown as a single component. In one example, the wireless mobile device 100 may include multiple memories (not shown).

The memory 130 may include a location determination algorithm 131, a mobility mode state detection algorithm 132, and one or more first-in, first-out (FIFO) queues 133. Each of one or more FIFO queues 133 may be executed in the form of a set of read and write pointer, data storage, and control logic. In one example, the data storage may represent any suitable form of storage, such as SRAM, flip-flops, latches, and the like, and the control logic may specify how the processor 150 may read/write to the data storage.

In one embodiment, the processor 150 may be configured to acquire the satellite navigation data from the GNSS receiver 110 and store the acquired satellite navigation data into one or more FIFO queues 133. In another embodiment, the processor 150 may also be configured to estimate the position data of the wireless mobile device 100 by executing a location determination algorithm 131 stored in the memory 130. Specifically, position data of the location may include position information, velocity and time of the location.

In the FIG. 1 example, the processor 150 may receive a request from an application of the wireless mobile device 100 that provides real-time position information of a location for the wireless mobile device 100. The processor 150 may acquire the current satellite navigation data from the GNSS receiver 110 that is stored in a given FIFO queue of the one or more FIFO queues 133. The processor 150 may be caused to execute the location determination algorithm 131 to determine the current position data of the wireless mobile device 100 based on the acquired satellite navigation data. For example, the position data (i.e., the position information, velocity, and time) calculations may use a recursive algorithm, or any other suitable algorithms. The processor 150 may also be configured to store the position data of the wireless mobile device 100 into one or more FIFO queues 133 as the current position data is determined.

In one embodiment, the processor 150 may be configured to detect a current mobility mode in which the wireless mobile device 100 is in by executing a mobility mode state detection algorithm 132 stored in the memory 130.

In the FIG. 1 example, the processor 150 may acquire the current position data of the wireless mobile device 100 that is stored in a given FIFO queue of the one or more FIFO queues 133. Specifically, the processor 150 may acquire the current velocity data from the current position data of the wireless mobile device 100. The processor 150 may also acquire the previous mobility mode state data of the wireless mobile device 100 that is stored in another FIFO queue of the one or more FIFO queues 133. The processor 150 may be caused to execute the mobility mode state detection algorithm 132 to determine the current mobility mode of the wireless mobile device 100 based on the acquired velocity data and the previous mobility mode state data. For example, the current mobility mode state detection logic is configured to dynamically find the most likely hidden mobility mode (described further below) that results in an observed velocity.

A hidden Markov model (HMM) is a statistical Markov model in which the system being modeled is assumed to be a Markov process with unobserved (hidden) states. In simpler Markov models (like a Markov chain), the state is directly visible to the observer, and therefore the state transition probabilities are the only parameters. In a hidden Markov model, the state is not directly visible, but the output, dependent on the state, is visible. Each state has a probability distribution over the possible output tokens. Therefore, the sequence of tokens generated by an hidden Markov model gives some information about the sequence of states. The adjective 'hidden' refers to the state sequence through which the model passes, not to the parameters of the mode. Further details of mobility mode state detection processes will be described below with reference to FIGS. 2 through 5. The processor 150 may also be configured to store the mobility mode state data of the wireless mobile device 100 into one or more FIFO queues 133 as the current mobility mode is determined.

In response to receiving the results of mobility mode state detection process, the processor 150 may be configured to control the output of the position data by acquiring the satellite navigation data on an interval basis. In one embodiment, the processor 150 may output position data by acquiring the satellite navigation data once per second, multiple times per second, once per minute, multiple times per minute, etc.

In one example, the processor 150 may be configured to output position data by acquiring the satellite navigation data at a predetermined rate (e.g., once per second) from a given FIFO queue of the one or more FIFO queues 133 while the mobility of the wireless mobile device 100 is in driving mode state. In another example, the processor 150 may be configured to output position data by acquiring the satellite navigation data at a predetermined rate (e.g., once per five seconds) from a given FIFO queue of the one or more FIFO queues 133 while the mobility of the wireless mobile device 100 is in walking mode state. In yet another example, the processor 150 may be configured to stop the output of the position data through no acquisition of the satellite navigation data while the mobility of the wireless mobile device 100 is in static mode state. However, the example is not meant to be limiting. In other examples, the processor 150 may be configured to control the output of the position data by acquiring the satellite navigation data at different respective intervals corresponding to the results of mobility mode state detection.

According to an aspect of the disclosure, by controlling the output of the position data at different respective intervals, the processor 150 seeks to prolong battery life as long as possible while providing levels of computing service. In one example, the wireless mobile device 100 includes a display (not shown). The display may be used by the wireless mobile device 100 to show location-based data to a user of the device. For example, the display may be used to show position information of a location of the wireless mobile device 100 on a map as part of an application for providing directions to a user. Refreshing the display may be associated with an energy cost. When the refresh rate of the display is at a high level (e.g., the display is used to show position information of a location of the wireless mobile device 100 on a map once per second), the power consumption of the display may be significantly higher than when the display is refreshed at a lower rate (e.g., the display is used to show position information of a location of the wireless mobile device 100 on a map once per five seconds).

As shown in FIG. 1, the GNSS receiver 110, the memory 130, and the processor 150 may be coupled together by one or more system buses, networks, or other coupling mechanisms. In one example, the wireless mobile device 100 may include a device platform, which may be configured as multi-layered Linux platform. The device platform may include different applications and an application framework, as well as various kernels, libraries, and runtime entities. In another example, other formats or systems may operate the wireless mobile device 110 as well.

Figure 2A:
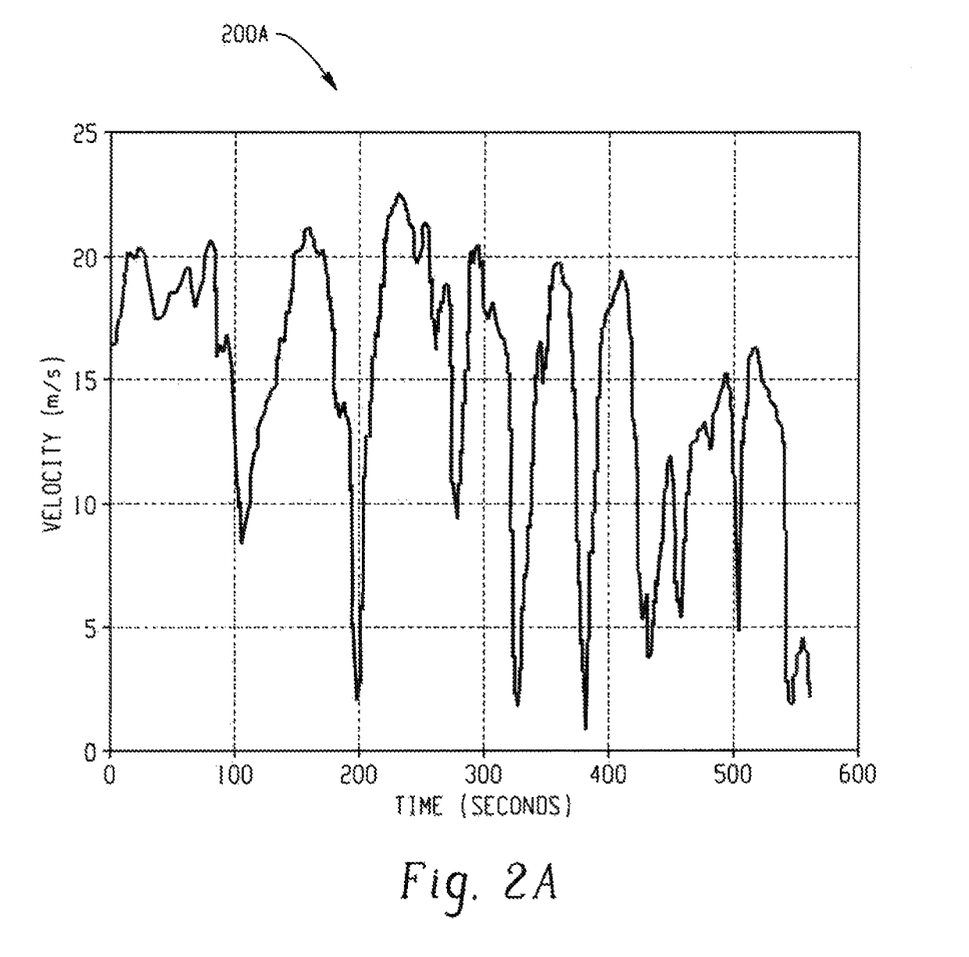
FIGS. 2A-2C is example diagrams illustrating the observed velocity corresponding to mobility mode of the wireless mobile device according to an embodiment of the disclosure.
Figure 2B:
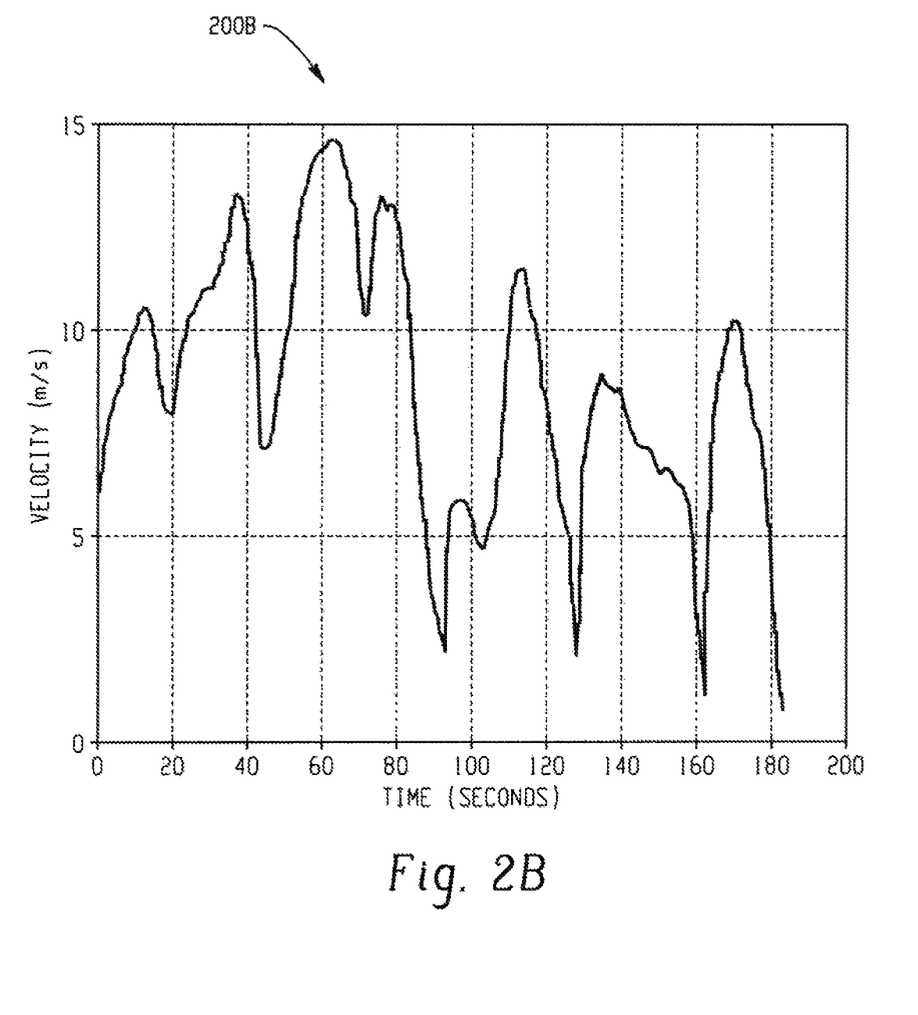
Figure 2C:
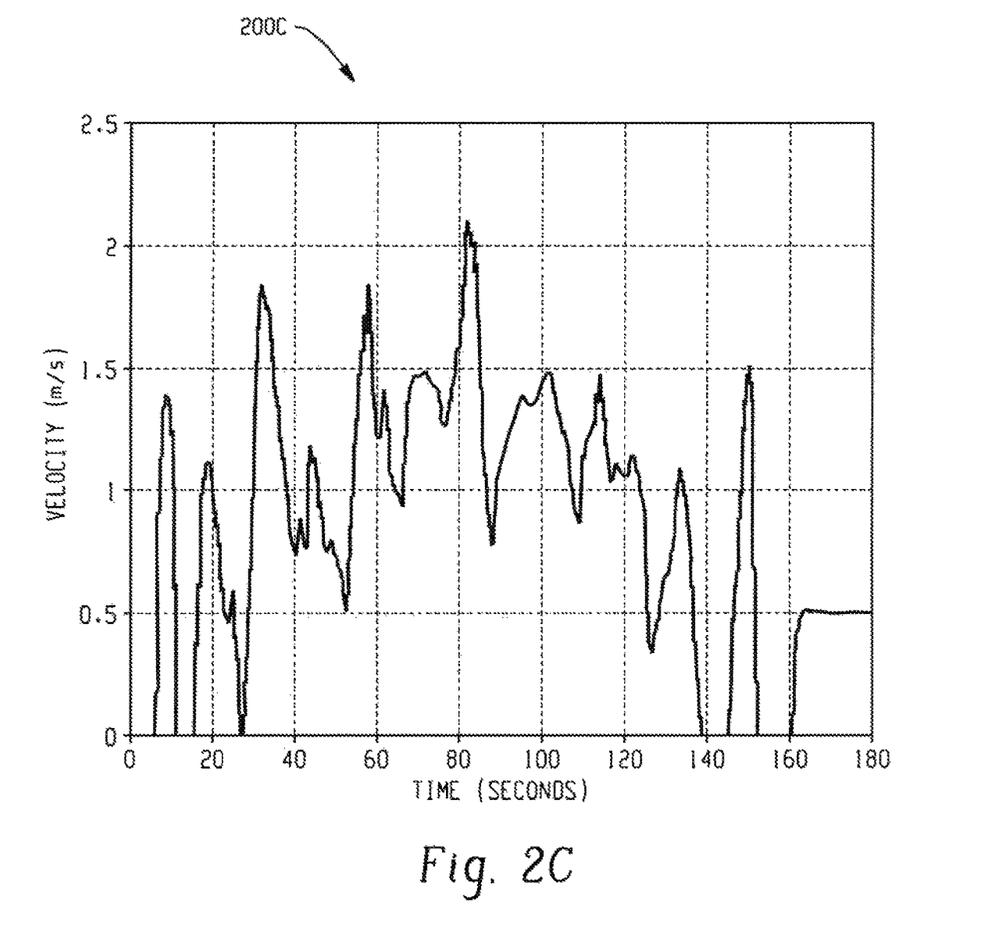

FIGS. 2A-2C are example diagrams illustrating the observed velocity corresponding to mobility mode of the wireless mobile device according to some embodiments of the disclosure. As illustrated therein, horizontal axes of FIGS. 2A-2C represent sampling points indicating the locations of the wireless mobile device, and vertical axes of FIGS. 2A-2C represent the observed velocities at the points (i.e., the locations). As described above, the position data of the location may include position information, velocity and time of the location that is calculated based on the satellite navigation data sent from the GNSS receiver 110 in the FIG. 1 example. The observed velocity at a location may be used to hiddenly (i.e., using a hidden state) describe a current mobility mode state of the wireless mobile device at a location.

The diagram 200A of FIG. 2A illustrates the observed velocities while the mobility of the wireless mobile device is in fast driving mode state, near 60 kilometers (km) per hour, for example. The diagram 200B of FIG. 2B illustrates the observed velocities while the mobility of the wireless mobile device is in slow driving mode state, near 30 km per hour, for example. The diagram 200C of FIG. 2C illustrates the observed velocities while the mobility of the wireless mobile device is in walking mode state, near 3 km per hour, for example. In one embodiment, the sample mean and standard deviation, based on the observed velocities of each mobility mode state, can be determined to reflect a confidence of hidden mobility mode estimate. In one example, a ±1-sigma may be used to reflect two-sided confidence limits of hidden mobility mode estimate if the mobility of the wireless mobile device is in fast driving mode state. In another example, a ±2-sigma may be used to reflect two-sided confidence limits of hidden mobility mode estimate if the mobility of the wireless mobile device is in slow driving mode state. In yet another example, a +2-sigma and −1-sigma may separately be used to reflect two-sided confidence limits of hidden mobility mode estimate if the mobility of the wireless mobile device is in walking mode state. However, the example is not meant to be limiting. In other examples, the wireless mobile device may estimate its hidden mobility mode in response to the observed velocities at different mobility mode states to define the different respective confidence limits.

According to an aspect of the disclosure, once the mobility mode of the wireless mobile device at a location is hiddenly (i.e., using a hidden state) estimated from the observed velocity at a location, the system is configured to dynamically find a sequence of optimal mobility mode state from a sequence of velocity observations. In one embodiment, the Viterbi algorithm for finding the most likely sequence of hidden mobility mode state is used based on a Hidden Markov Model (HMM).

Figure 3:
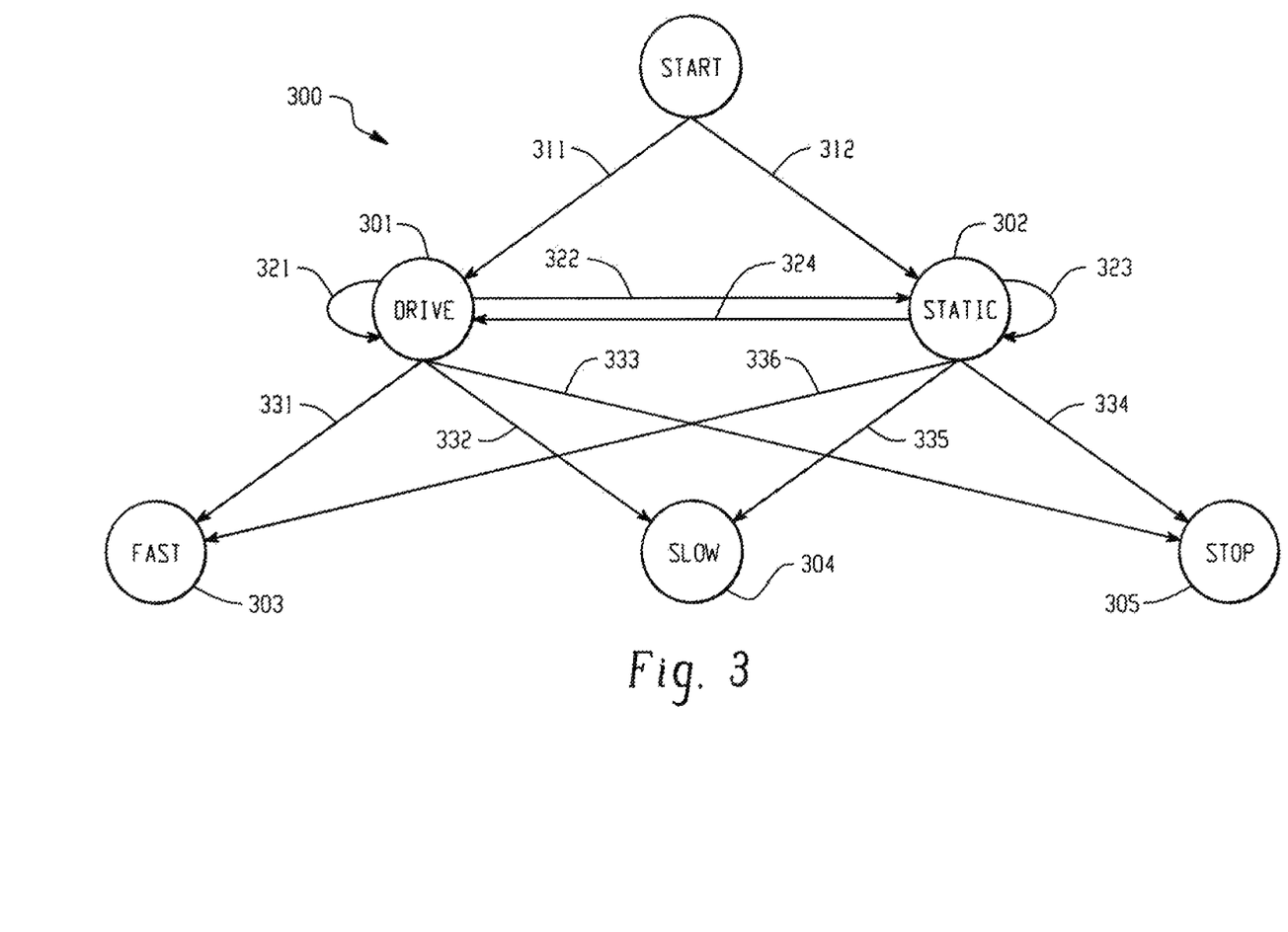
FIG. 3 is an example diagram illustrating a graphical representation of the given Hidden Markov Model (HMM) associated with mobility mode state detection according to an embodiment of the disclosure.

FIG. 3 is an example diagram illustrating a graphical representation of the given HMM 300 associated with mobility mode state detection according to some embodiments of the disclosure. The example is not meant to be limiting. The graphical representation of the HMM 300 may be changed depending on the mobility mode of the wireless mobile device.

As indicated in the graphical illustration of FIG. 3, the state space may include the examples of a first state 301 and a second state 302. According to an aspect of the disclosure, the state space corresponding to mobility mode of the wireless mobile device may include two or more states. In one example, if the mobility mode of the wireless mobile device is driving mode, the examples of "Drive" (301) and "Static" (302) states can be defined in the state space. In another example, if the mobility mode of the wireless mobile device is walking mode, the examples of "Walk" (301) and "Static" (302) states can be defined in the state space.

As indicated in the graphical illustration of FIG. 3, the observation space may include the examples of a first observation 303, a second observation 304, and a third observation 305. According to an aspect of the disclosure, the observation space corresponding to mobility mode of the wireless mobile device may include two or more observations. In one example, if the space of the wireless mobile device at a location is in the example of "Drive" (301) state, there is only a certain probability that the wireless mobile device will have the example of "fast" (303), "slow" (304), or "stop" (305) observation depending on the observed velocity at the location. In another example, if the space of the wireless mobile device at a location is in the example of "Walk" (301) state, there is only a certain probability that the wireless mobile device will have the example of "slow" (303) or "stop" (304) observation depending on the observed velocity at the location.

In one embodiment, the probabilistic parameters of a given HHM 300 may include initial probability, transition probability, and emission probability. As indicated in the graphical illustration of FIG. 3, the initial probabilities 311 and 312 represent the initial estimation of the wireless mobile device about which state the HMM 300 is in when the wireless mobile device first moves at a first time. In an example, when the wireless mobile device first moves at the first time, there is only a certain chance (311) that the space of the device is in the example of "Drive" (301) state, or in the example of "Static" (302) state.

In one embodiment, the transition probabilities 321, 322, 323, and 324 represent the change of the mobility mode state in the underlying Markov chain. In one example, if the space of the wireless mobile device at time "t−1" is in the example of "Drive" (301) state, there is only a certain chance (321) that the space of the device at time "t" is in the example of "Drive" (301) state, or in the example of "Static" (302) state.

In another embodiment, the emission probabilities 331, 332, 333, 334, 335, and 336 represent how likely the wireless mobile device is to have a certain velocity at each time (or at each location). In one example, if the space of the wireless mobile device at time "t" is in the example of "Drive" (301) state, there is only a certain chance (331) that the device moves with the example of "fast" (303), "slow" (304), or "stop" (305) observation.

Figure 4:
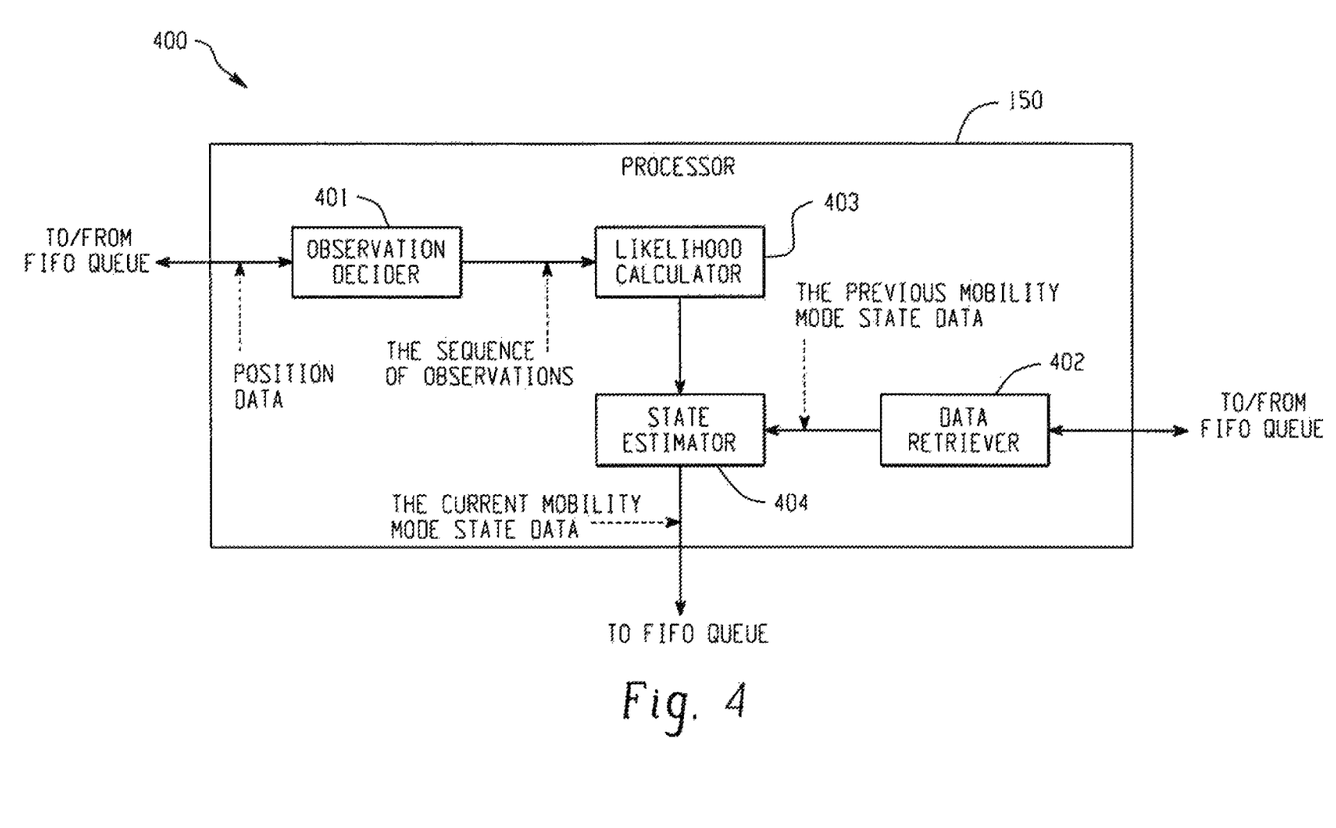
FIG. 4 is a block diagram illustrating an example system for detecting a mobility mode of the wireless mobile device according to an embodiment of the disclosure.

FIG. 4 is a block diagram illustrating an example system 400 for detecting a mobility mode of the wireless mobile device according to some embodiments of the disclosure. System 400 shown in FIG. 4 presents an embodiment that may be executed by the processor 150 described in the FIG. 1 example, or more generally by any wireless mobile device. The system 400 may include one or more computing units as illustrated by one or more of 401-404. Each of 401-404 may present a module, a segment, or a portion of program code, which includes one or more instructions executable by a processor or wireless mobile device for implementing specific logical functions or steps in the process.

The system 400 acquires data from a given FIFO queue of the one or more FIFO queues that includes current position data, which acts as a trigger to detect a mobility mode of a wireless mobile device. Specifically, the processor 150 may acquire current velocity data of the position data, which is treated as a trigger to detect a mobility mode state of a wireless mobile device.

The system 400 includes an observation decider module 401 that is configured to make a current observation decision (e.g., a decision indicating the kind of observation space the wireless mobile device currently resides) based on input velocity data (i.e., an acquired velocity data). In one embodiment, the observation decider 401, based on the confidence limits of hidden mobility mode estimate, decides whether the wireless mobile device is in the "fast", "slow", or "stop" observation space based the input velocity data.

In an example of one embodiment, when the wireless mobile device first moves at time "t", the input velocity data is very small (e.g., below 2 meters per second). Despite some detected movement, the observation decider 401 decides the wireless mobile device to be in the "stop" observation space because the input velocity data does not reflect a sufficient confidence of a different hidden mobility mode state (i.e., the input velocity data is not within any of the confidence limits of other movement-indicating hidden mobility mode state). When the wireless mobile device later moves at time "t1", the input velocity data is small (e.g., 10 meters per second). The observation decider 401 decides the wireless mobile device to be in the example of "slow" observation space because the input velocity data reflects a confidence of the "slow" hidden mobility mode state (i.e., the input velocity data is within the confidence limits of hidden mobility mode state as shown in the FIG. 2B example) more than other hidden mobility mode states. When the wireless mobile device moves at time "t2", the input velocity data is large (e.g., 20 meters per second). The observation decider 401 decides the wireless mobile device to be in the "fast" observation space because the input velocity data reflects a confidence of that hidden mobility mode state (i.e., the input velocity datum is within the confidence limits of hidden mobility mode state as shown in FIG. 2A example) more than other hidden mobility mode states.

In some implementations, when the wireless mobile device, such as the wireless mobile device 100 in the FIG. 1 example, continuously moves during a time period from time "t" to "tn", the observation decider 401 outputs a sequence of observations. The observation decisions (e.g., stop|slow|fast) become the input parameters to the Hidden Markov Model implemented in the likelihood calculator 403 as the observations of a moving device.

In response to receiving a sequence of observations from the observation decider 401, the system 400 may be configured to recursively find the most probable sequence of hidden mobility mode states from the sequence of observations. Specifically, the system 400 recursively finds the most probable sequence of hidden mobility mode state using a dynamic programming algorithm, for example, a Viterbi algorithm that proceeds until the entirety of a processing tree is traversed.

The system 400 is configured to find the hidden mobility mode state by acquiring, using a data retriever 402 and from a given FIFO queue of one or more FIFO queues, mobility mode state data of the wireless mobile device. The mobility mode state data may include the observation and probability of the state that was determined at the previous time stored in the queue.

The system 400 is configured to find the hidden mobility mode state by calculating, using a likelihood calculator 403, the probability of each of a plurality of mobility modes based on a sequence of observations. The probabilities indicate how the past observations from the data retriever 402 and the current observation from the observation decider 401 are explainable by the Hidden Markov Model. That is, the Hidden Markov Model implemented in the likelihood calculator 403 is configured to determine the probability of reaching a particular state based on given observation inputs. That probability can be calculated using knowledge of the previous state (e.g., the observation and probability of the previous state), using the transition probability, and multiplying by an emission probability of observation for the state. Probabilities for each (or a subset of each) of the possible states are determined and provided to the state estimator 404 for further processing.

The system 400 is configured to find a hidden mobility mode state by using the state estimator 404 to obtain the maximum probability for the detected mobility mode states. The maximum probability indicates how detected mode states occur given observations on the HMM. The maximum probability is the maximum probability of all state sequences received from the likelihood calculator 403 for a particular time. The state estimator 404 is configured to determine an output mobility mode state with the maximum probability.

The system 400 is configured to output mobility mode state data for storage at the wireless mobile device. That mobility mode state data may include the observation and probability of the state that was determined at the current time (e.g., at time "t") to be stored in a given FIFO queue of the one or more FIFO queues. In one example, the mobility mode state data of the wireless mobile device determined at time "t" can be regarded as given knowledge of the previous state when detecting the mobility mode state data of the wireless mobile device at time "t+1".

Figure 5:
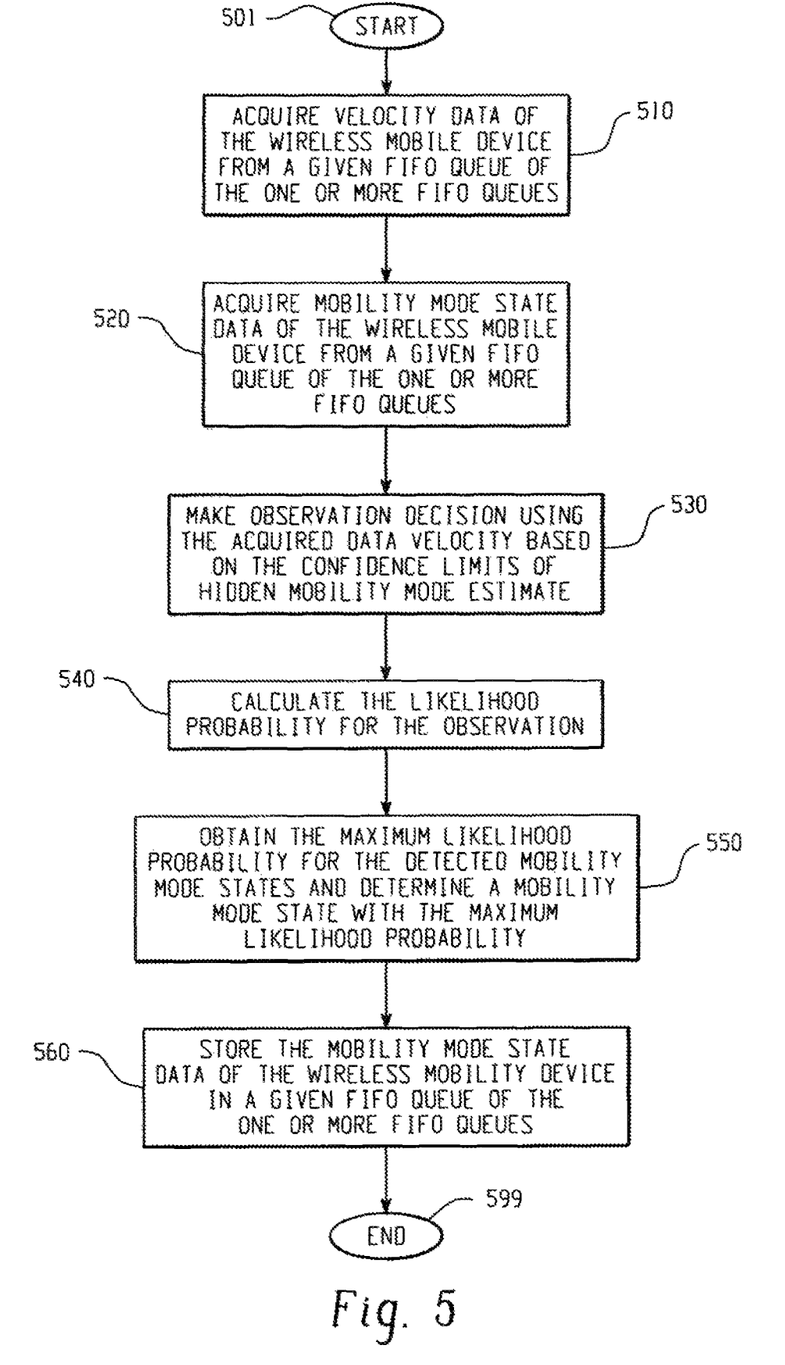
FIG. 5 is a flowchart diagram outlining a process example for detecting a mobility mode of the wireless mobile device according to an embodiment of the disclosure.

FIG. 5 is a flowchart diagram illustrating an example process 500 for detecting mobility mode of the wireless mobile device according to some embodiments of the disclosure. In an example, the process is executed by the processor 150 in the FIG. 1 example, or more generally by any wireless mobile device. The process starts at 501 and proceeds to 510. At 510, the processor acquires position data of the wireless mobile device from a given FIFO queue of one or more FIFO queues. The position data may include position information, velocity and time of the location that is calculated based on the satellite navigation data sent from the GNSS receiver 110 in the FIG. 1 example. The position data may indicate a request to detect mobility mode of a wireless mobile device. For an example, the processor may acquire velocity data of the position data indicating a request to detect mobility mode of a wireless mobile device.

At 520, the processor acquires mobility mode state data of the wireless mobile device from a given FIFO queue of the one or more FIFO queues. The mobility mode state data may include the observation and probability of the state that was determined at the previous time to be stored in the queue.

At 530, the processor makes an observation decision based on an acquired velocity data. The observation decision may indicate which kinds of space the wireless mobile device is in. For an example, the processor may decide the wireless mobile device to be in the example of "fast", "slow", or "stop" observation space using the acquired velocity data based on the confidence limits of hidden mobility mode estimate.

The processor may recursively find the most probable mobility mode state in response to receiving the observation decision performed at 530. At 540, the processor calculates the probability for the observation. The probability can be calculated by the previous state (e.g., the observation and probability of the previous state) acquired at 520, using the transition probability and multiplying by the emission probability of observation for the state. At 550, the processor obtains the maximum probability for the detected mobility mode states at 540 and determines a mobility mode state with the maximum probability. The maximum probability is the maximum probability of all state sequences ending at a particular state at a time. At 560, the processor stores the mobility mode state data of the wireless mobile device in a given FIFO queue of the one or more FIFO queues. The process proceeds to 599 and terminates.

In some implementations, when the wireless mobile device moves from time "t" to "tn", the processor may determine a sequence of observations and detect the most probable sequence of hidden mobility mode states by repeating the process from 510 to 560.

Generally, the combinations of various types of Micro-electro-mechanical Systems (MEMS) sensors, for example, a combination of accelerometer and gyroscope, are used to detect mobility mode for the wireless mobile device in GNSS applications. Although it may make a sense to detect mobility mode using MEMS sensors coupled to the wireless mobile device, the detection, depending on the position and direction of the device, may ambiguous, if the real-time calibrations of MEMS sensors does not work well, and accordingly the probability that the mobility mode detection containing "un-definition" may be high. In some implementations, the wireless mobile device may optionally combine the result of mobility mode state detected using the GNSS receiver and the result of mobility mode state detected using the MEMS sensors to reduce the ambiguous resolution in mobility mode state determination. In this example, the mobility mode state determination can be achieved based on a statistical model or a weighting function model.

The systems' and methods' data (e.g., associations, mappings, data input, data output, intermediate data results, final data results, etc.) and instructions may be stored and implemented in one or more different types of computer-implemented non-transitory data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

It is claimed:

1. An apparatus for detecting mobility mode state of a wireless mobile device, the apparatus comprising:
    a receiver configured to receive satellite navigation data from a satellite navigation system;
    a memory configured to include a location determination algorithm, a mobility mode state detection algorithm, and one or more first-in, first-out (FIFO) queues; and
    a processor configured to:
        acquire the satellite navigation data, and store the satellite navigation data in the one or more FIFO queues;
        estimate position data of the wireless mobile device by executing the location determination algorithm stored in the memory, and store the position data of the wireless mobile device in the one or more FIFO queues, wherein the position data includes position information, velocity, and time associated with the position data; and
        detect a mobility mode state in which the wireless mobile device is in by executing the mobility state detection algorithm stored in the memory, based on the velocity acquired from the estimated position data and previous mobility mode state data and store the mobility mode state of the wireless mobile device in the one or more FIFO queues.

2. The apparatus of claim 1, wherein the processor is configured to make the observation decision using confidence limits of a hidden mobility mode estimate based on the velocity.

3. The apparatus of claim 2, wherein the processor is configured to determine a confidence of the hidden mobility mode estimate by determining a sample mean and standard deviation based on velocities of each mobility mode state.

4. The apparatus of claim 1, wherein the processor is configured to detect the mobility mode state of the wireless mobile device by:
    acquiring mobility mode state data of the wireless mobile device from the one or more FIFO queues, wherein the mobility mode state data includes an observation decision and probability of a state that was determined at a previous time; and
    in response to acquiring the observation decision, finding a most probable mobility mode state of the wireless mobile device using a dynamic programming algorithm based on a Hidden Markov Model.

5. The apparatus of claim 4, wherein finding the most probable mobility mode state comprises:
    calculating a probability for the observation decision;
    obtaining a maximum probability for a plurality of mobility mode states;
    determining the most probable mobility mode state based on the maximum probability; and
    storing the most probable mobility mode state data of the wireless mobile device in the one or more FIFO queues.

6. The apparatus of claim 5, wherein the probability for the observation decision is calculated based on the observation decision and the probability of the previous state, a transition probability, and an emission probability for a particular state.

7. The apparatus of claim 5, wherein the maximum probability of all state sequences ending at a particular state at a particular time.

8. The apparatus of claim 1, wherein the processor is configured to control output of the position data by acquiring the satellite navigation data on an interval basis.

9. A method for detecting mobility mode state of a wireless mobile device, the method comprising:
- receiving satellite navigation data sent from a satellite navigation system;
- accessing a memory that stores a location determination algorithm, a mobility mode state detection algorithm, and one or more first-in, first-out (FIFO) queues;
- acquiring, using a processor, the satellite navigation data, and storing the acquired satellite navigation data into one or more FIFO queues;
- estimating, using the processor, position data of the wireless mobile device by executing the location determination algorithm stored in the memory, and storing the position of the wireless mobile device into the one or more FIFO queues as the position data is determined, wherein the position data includes position information, velocity, and time associated with the position data; and
- detecting, using the processor, a mobility mode state in which the wireless mobile device is in by executing the mobility mode state detection algorithm stored in the memory based on the velocity acquired from the estimated position data and previous mobility mode state data, and storing the mobility mode state of the wireless mobile device into the one or more FIFO queues as the mobility mode is determined.

10. The method of claim 9, wherein the observation decision is made using confidence limits of a hidden mobility mode estimate based on the determined velocity.

11. The method of claim 10, wherein a confidence of the hidden mobility mode estimate is determined using a sample mean and standard deviation based on velocities of each mobility mode state.

12. The method of claim 9, wherein detecting, using the processor, mobility mode state of the wireless mobile device further comprises:
- acquiring mobility mode state data of the wireless mobile device from the one or more FIFO queues, wherein the mobility mode state data includes an observation decision and probability of a state that was determined at a previous time; and
- in response to acquiring the observation decision, finding a most probable mobility mode state of the wireless mobile device using a dynamic programming algorithm based on a Hidden Markov Model.

13. The method of claim 12, further comprising:
- calculating a probability for the observation decision;
- obtaining a maximum probability for a plurality of mobility mode states;
- determining the most probable mobility mode state based on the maximum probability; and
- storing the most probable mobility mode state data of the wireless mobile device in the one or more FIFO queues.

14. The method of claim 13, wherein the probability for the observation decision is calculated based on the observation decision and the probability of the previous state, a transition probability, and an emission probability for a particular state.

15. The method of claim 13, wherein the maximum probability is a maximum probability of all state sequences ending at a particular state at a particular time.

16. The method of claim 9, wherein the output of the position data is controlled by acquiring the satellite navigation data on an interval basis.

\* \* \* \* \*